US012561345B2

(12) United States Patent
Han et al.

(10) Patent No.: US 12,561,345 B2
(45) Date of Patent: Feb. 24, 2026

(54) GENERATING AN ARTIFICIAL DATA SET

(71) Applicant: International Business Machines Corporation, Armonk, NY (US)

(72) Inventors: Si Er Han, Xi'an (CN); Xiao Ming Ma, Xi'an (CN); Rui Wang, Xian (CN); Jing James Xu, Xi'an (CN); Jing Xu, Xi'an (CN); Xue Ying Zhang, Xi'an (CN); Lei Tian, Xi'an (CN); Dong Hai Yu, Xian (CN)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 18/485,348

(22) Filed: Oct. 12, 2023

(65) Prior Publication Data

US 2025/0124052 A1 Apr. 17, 2025

(51) Int. Cl.
*G06F 16/28* (2019.01)
*G06F 16/2455* (2019.01)

(52) U.S. Cl.
CPC ........ *G06F 16/285* (2019.01); *G06F 16/2456* (2019.01); *G06F 16/288* (2019.01)

(58) Field of Classification Search
CPC ... G06F 16/285; G06F 16/2456; G06F 16/221
USPC ........................................................ 707/737
See application file for complete search history.

(56) References Cited

U.S. PATENT DOCUMENTS

| | | | | |
|---|---|---|---|---|
| 6,493,637 | B1 * | 12/2002 | Steeg ..................... | G16B 30/10 |
| | | | | 702/19 |
| 10,552,996 | B2 * | 2/2020 | Sinha ..................... | G06F 16/35 |

| | | | | |
|---|---|---|---|---|
| 2004/0059736 | A1 * | 3/2004 | Willse ..................... | G06F 40/20 |
| 2008/0109454 | A1 * | 5/2008 | Willse ................... | G06F 16/313 |
| | | | | 707/E17.084 |
| 2020/0327252 | A1 * | 10/2020 | McFall ................... | G06F 21/78 |
| 2022/0035842 | A1 | 2/2022 | Chen et al. | |
| 2022/0269554 | A1 | 8/2022 | Saxena et al. | |

FOREIGN PATENT DOCUMENTS

CN      116483823  A      7/2023

OTHER PUBLICATIONS

Anonymous, "Simulation Fitting Node," IBM Documentation, URL: https://www.ibm.com/docs/en/spss-modeler/18.4.0?topic=nodes-simulation-fitting-node; Retrieved: Sep. 19, 2023, 1 page.

* cited by examiner

*Primary Examiner* — Hung T Vy
(74) *Attorney, Agent, or Firm* — CANTOR COLBURN LLP; Kelsey Skodje

(57) ABSTRACT

A computer-implemented method for generating an artificial data set is provided. Aspects include obtaining an input data set, calculating an association between the plurality of categorical variables of the input data set, and creating, based on the association, a plurality of clusters of categorical variables. Aspects also include identifying a key variable for each of the plurality of clusters of categorical variables, creating a key cluster for each of the plurality of clusters, and creating a cluster contingency table for each of the clusters. Aspects further include generating, based on the cluster contingency table for each of the plurality of clusters and for the key cluster, a data set for each of the plurality of clusters and the key cluster and generating the artificial data set based on a combination of the data set for each of the plurality of clusters and the key cluster.

20 Claims, 7 Drawing Sheets

100

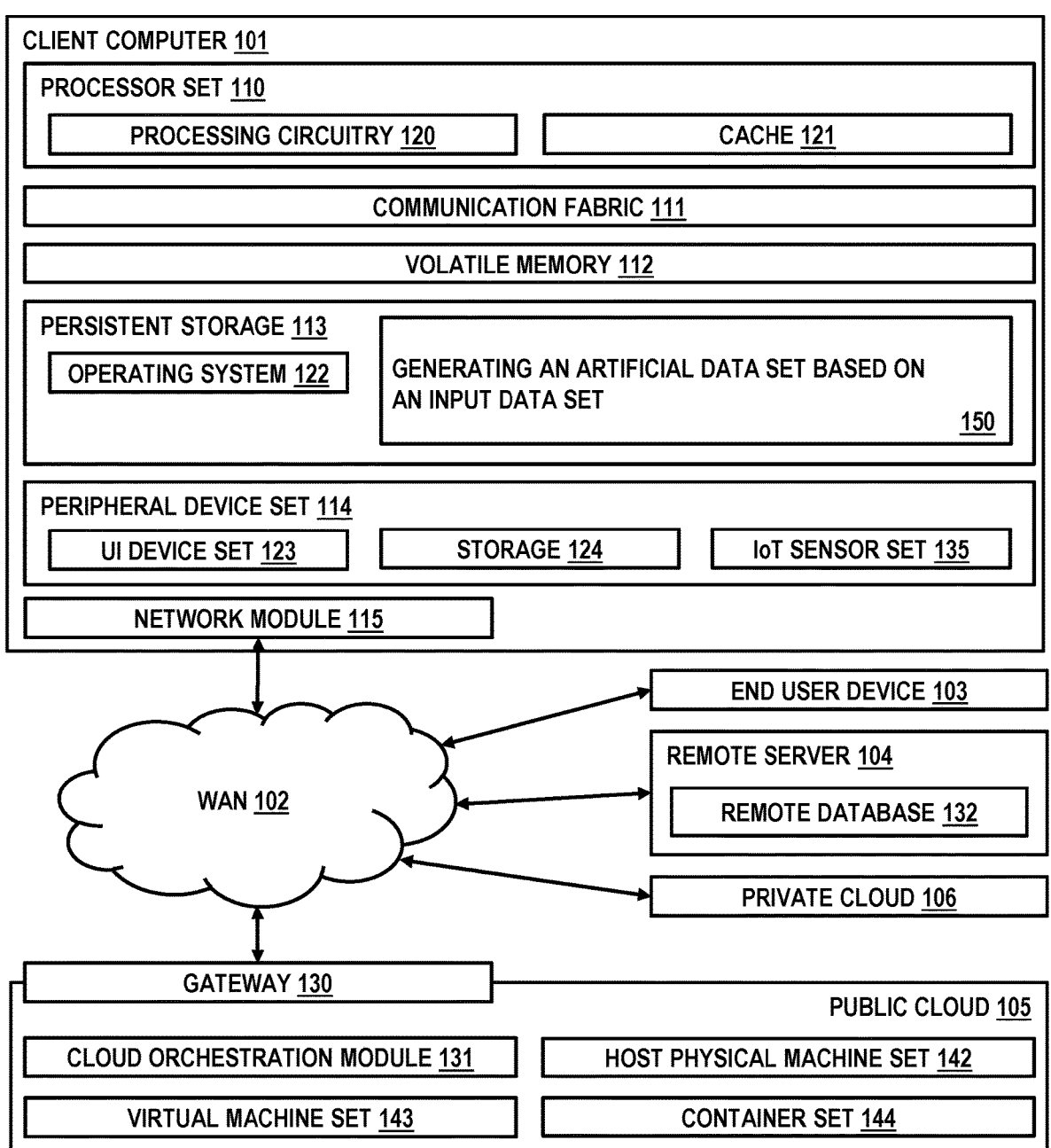

CLIENT COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122          GENERATING AN ARTIFICIAL DATA SET BASED ON AN INPUT DATA SET
150

PERIPHERAL DEVICE SET 114

UI DEVICE SET 123          STORAGE 124          IoT SENSOR SET 135

NETWORK MODULE 115

WAN 102

END USER DEVICE 103

REMOTE SERVER 104

REMOTE DATABASE 132

PRIVATE CLOUD 106

GATEWAY 130

PUBLIC CLOUD 105

CLOUD ORCHESTRATION MODULE 131          HOST PHYSICAL MACHINE SET 142

VIRTUAL MACHINE SET 143          CONTAINER SET 144

*FIG. 1*

| id | x1 | x2 | Frequency |
|---|---|---|---|
| 1 | 1 | 1 | 0.4 |
| 2 | 1 | 2 | 0.2 |
| 3 | 1 | 3 | 0.2 |
| ... | ... | ... | ... |
| 1000 | 50 | 1 | 0.05 |
| 1001 | Others | Others | 0.15 |

Condensed Cluster Contingency table

| id | x1 | x2 | Frequency |
|---|---|---|---|
| 1 | 1 | 1 | 0.4 |
| 2 | 1 | 2 | 0.2 |
| 3 | 1 | 3 | 0.2 |
| ... | ... | ... | ... |
| 1000 | 50 | 1 | 0.05 |
| 1001 | 50 | 2 | 0.001 |
| ... | ... | ... | ... |
| 10000 | 100 | 100 | 0.0001 |

Cluster Contingency table

900

OBTAIN AN INPUT DATA SET HAVING A PLURALITY OF ENTRIES, WHEREIN EACH ENTRY INCLUDES A PLURALITY OF CATEGORICAL VARIABLES   902

CALCULATE, BASED ON THE INPUT DATA SET, AN ASSOCIATION BETWEEN EACH OF THE PLURALITY OF CATEGORICAL VARIABLES   904

CREATE, BASED ON THE ASSOCIATION, A PLURALITY OF CLUSTERS OF CATEGORICAL VARIABLES, WHEREIN EACH OF THE PLURALITY OF CLUSTERS INCLUDES AT LEAST A NUMBER OF THE PLURALITY OF CATEGORICAL VARIABLES   906

IDENTIFY A KEY VARIABLE FOR EACH OF THE PLURALITY OF CLUSTERS OF CATEGORICAL VARIABLES FROM THE AT LEAST THE NUMBER OF THE PLURALITY OF CATEGORICAL VARIABLES   908

CREATE A KEY CLUSTER INCLUDING THE KEY VARIABLE FOR EACH OF THE PLURALITY OF CLUSTERS   910

CREATE A CLUSTER  CONTINGENCY TABLE FOR EACH OF THE PLURALITY OF CLUSTERS AND FOR THE KEY CLUSTER, WHEREIN THE CLUSTER CONTINGENCY TABLES INCLUDE COMBINATIONS OF VALUES OF THE CATEGORICAL VARIABLES OBTAINED FROM THE INPUT DATA SET AND CORRESPONDING FREQUENCY OF EACH COMBINATION   912

GENERATE, BASED ON THE CLUSTER CONTINGENCY TABLE FOR EACH OF THE PLURALITY OF CLUSTERS AND FOR THE KEY CLUSTER, A DATA SET FOR EACH OF THE PLURALITY OF CLUSTERS AND THE KEY CLUSTER   914

GENERATE THE ARTIFICIAL DATA SET BASED ON A COMBINATION OF THE DATA SET FOR EACH OF THE PLURALITY OF CLUSTERS AND THE KEY CLUSTER   916

FIG. 9

GENERATING AN ARTIFICIAL DATA SET

BACKGROUND

The present invention generally relates to data processing, and more specifically, to generating an artificial data set based on an input data set.

Data simulation is a common problem in the data science area, especially in the area of data analysis. Data simulation is the process of generating artificial data that mimics the characteristics and patterns of real-world data. Data simulation is often used in various fields, including statistics, computer science, machine learning, and data analysis, to study and test different scenarios and algorithms without the need for actual data collection. In general, data simulation is performed by detecting patterns in a real-world data set and generating a new data set based on the detected patterns.

Current data simulation techniques include the creation of a contingency table that includes the frequency of each combination of categories from each categorical variable in an input data set. Once created, this contingency table can be used to generate the new data. However, as the number of categorical variables and the number of categories of each variable increases, the size of the contingency table will exponentially increase. In many cases, the contingency table will be too large to be stored and used for the new data generation.

SUMMARY

Embodiments of the present invention are directed to a computer-implemented method for generating an artificial data set. The computer-implemented method includes obtaining an input data set having a plurality of entries, wherein each entry includes a plurality of categorical variables, calculating, based on the input data set, an association between each of the plurality of categorical variables, and creating, based on the association, a plurality of clusters of categorical variables, wherein each of the plurality of clusters includes at least a number of the plurality of categorical variables. The method also includes identifying a key variable for each of the plurality of clusters of categorical variables from the at least the number of the plurality of categorical variables, creating a key cluster including the key variable for each of the plurality of clusters, and creating a cluster contingency table for each of the plurality of clusters and for the key cluster, wherein the cluster contingency tables include combinations of values of the categorical variables obtained from the input data set and corresponding frequency of each combination. The method further includes generating, based on the cluster contingency table for each of the plurality of clusters and for the key cluster, a data set for each of the plurality of clusters and the key cluster and generating the artificial data set based on a combination of the data set for each of the plurality of clusters and the key cluster.

Embodiments of the present invention are directed to a computer program product for generating an artificial data set. The computer program product includes one or more computer readable storage media having computer readable program code collectively stored on the one or more computer readable storage media. The computer readable program code is executed by a processor of a computer system to cause the computer system to perform operations. The operations include obtaining an input data set having a plurality of entries, wherein each entry includes a plurality of categorical variables, calculating, based on the input data set, an association between each of the plurality of categorical variables, and creating, based on the association, a plurality of clusters of categorical variables, wherein each of the plurality of clusters includes at least a number of the plurality of categorical variables. The operations also include identifying a key variable for each of the plurality of clusters of categorical variables from the at least the number of the plurality of categorical variables, creating a key cluster including the key variable for each of the plurality of clusters, and creating a cluster contingency table for each of the plurality of clusters and for the key cluster, wherein the cluster contingency tables include combinations of values of the categorical variables obtained from the input data set and corresponding frequency of each combination. The operations further include generating, based on the cluster contingency table for each of the plurality of clusters and for the key cluster, a data set for each of the plurality of clusters and the key cluster and generating the artificial data set based on a combination of the data set for each of the plurality of clusters and the key cluster.

Embodiments of the present invention are directed to a computing system including a processor, a memory coupled to the processor and one or more computer readable storage media coupled to the processor. The one or more computer readable storage media collectively contain instructions that are executed by the processor via the memory to cause the processor to perform operations. The operations include obtaining an input data set having a plurality of entries, wherein each entry includes a plurality of categorical variables, calculating, based on the input data set, an association between each of the plurality of categorical variables, and creating, based on the association, a plurality of clusters of categorical variables, wherein each of the plurality of clusters includes at least a number of the plurality of categorical variables. The operations also include identifying a key variable for each of the plurality of clusters of categorical variables from the at least the number of the plurality of categorical variables, creating a key cluster including the key variable for each of the plurality of clusters, and creating a cluster contingency table for each of the plurality of clusters and for the key cluster, wherein the cluster contingency tables include combinations of values of the categorical variables obtained from the input data set and corresponding frequency of each combination. The operations further include generating, based on the cluster contingency table for each of the plurality of clusters and for the key cluster, a data set for each of the plurality of clusters and the key cluster and generating the artificial data set based on a combination of the data set for each of the plurality of clusters and the key cluster.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 1 depicts a schematic diagram of a computing environment in accordance with one or more embodiments of the present invention;

FIG. 9 is a flow diagram illustrating a computer-implemented method for generating an artificial data set in accordance with one or more embodiments of the present invention.

Figure 2:
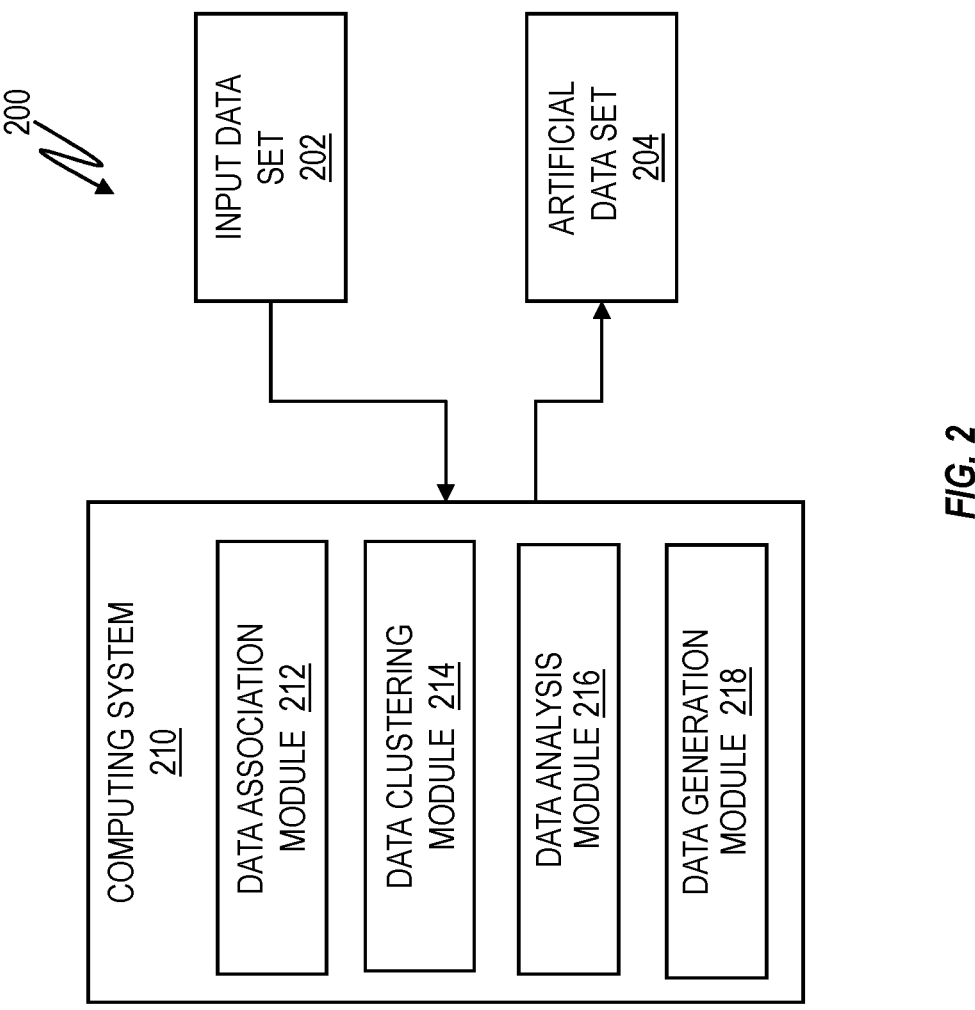
FIG. 2 depicts a block diagram illustrating a system for generating an artificial data set in accordance with one or more embodiments of the present invention.

The diagrams depicted herein are illustrative. There can be many variations to the diagram or the operations described therein without departing from the spirit of the invention. For instance, the actions can be performed in a differing order, or actions can be added, deleted, or modified. Also, the term "coupled" and variations thereof describes having a communications path between two elements and does not imply a direct connection between the elements with no intervening elements/connections between them. All of these variations are considered a part of the specification.

DETAILED DESCRIPTION

As discussed above, current data simulation techniques include the creation of a contingency table that includes the frequency of each combination of categories from each categorical variable in an input data set. As the number of categorical variables and the number of categories of each variable increases, the size of the contingency table will exponentially increase. As the contingency table increases in size, the memory and processing power needed to generate a new data set quickly become very substantial. In many cases, the contingency table will be too large to be stored and used for the new data generation.

In exemplary embodiments, systems, methods, and computer program products for generating an artificial data set are provided. In exemplary embodiments, categorical variables of an input data set are separated into clusters based on the association between the categorical variables and a contingency table for each of these clusters is generated. In addition, a key variable is identified for each cluster of categorical variables and a key cluster contingency table is generated. Next, cluster data sets are generated based on the contingency table for each of these clusters and a cluster data set is generated based on the key cluster contingency table. Finally, the artificial data set is created by joining the cluster data sets using the variables in the key cluster data set as a join key. In exemplary embodiments, this process improves the speed at which a computer can generate an artificial data set based on an input data set by reducing the processing steps and memory required. The reduction in memory and processing steps is achieved by splitting the input data set into clusters of data, generating contingency tables and data sets for each cluster, and then joining the generated data sets using a key cluster.

Embodiments of the present invention are directed to a computer-implemented method for generating an artificial data set. The computer-implemented method includes obtaining an input data set having a plurality of entries, wherein each entry includes a plurality of categorical variables, calculating, based on the input data set, an association between each of the plurality of categorical variables, and creating, based on the association, a plurality of clusters of categorical variables, wherein each of the plurality of clusters includes at least a number of the plurality of categorical variables. The method also includes identifying a key variable for each of the plurality of clusters of categorical variables from the at least the number of the plurality of categorical variables, creating a key cluster including the key variable for each of the plurality of clusters, and creating a cluster contingency table for each of the plurality of clusters and for the key cluster, wherein the cluster contingency tables include combinations of values of the categorical variables obtained from the input data set and corresponding frequency of each combination. The method further includes generating, based on the cluster contingency table for each of the plurality of clusters and for the key cluster, a data set for each of the plurality of clusters and the key cluster and generating the artificial data set based on a combination of the data set for each of the plurality of clusters and the key cluster. One technical benefit of this method for generating an artificial data set is that splitting the input data set into clusters and creating multiple cluster contingency tables, the speed at which a computer can generate the artificial data set is increased by greatly reducing the memory and processing capacity needed to process a single larger contingency table.

Additionally, or alternatively, in embodiments of the present invention the key variable for a cluster of categorical variables is identified as the categorical variable of the cluster having a largest average association with other categorical variables of the cluster. One technical benefit of identifying key variables from each cluster and forming a key cluster using the key variables is that the key cluster can be used as a join key to join data sets formed for each cluster of data.

Additionally, or alternatively, in embodiments of the present invention the association between each of the plurality of categorical variables is calculated as a Cramér's V value. One technical benefit of using the Cramer's V value to measure the association between each of the plurality of categorical variables is that the Cramér's V accurately measure how strongly two categorical variables are associated.

Additionally, or alternatively, in embodiments of the present invention the cluster contingency table for each of the plurality of clusters includes combinations with corresponding frequency values above a threshold minimum. One technical benefit of Additionally, or alternatively, in embodiments of the present invention the threshold minimum is received from a user. One technical benefit of creating multiple cluster contingency tables is that the speed at which a computer can generate the artificial data set is increased by greatly reducing the memory and processing capacity needed to process a single larger contingency table.

Additionally, or alternatively, in embodiments of the present invention generating the artificial data set includes joining the data set for each of the plurality of clusters using the data set of the key cluster as a join key. One technical benefit of generating multiple data sets and joining the data sets using the key cluster is that the processing resources needed to generate the multiple data sets is much less than the processing resources needed to generate a single data set based on one larger contingency table.

Additionally, or alternatively, in embodiments of the present invention receiving a requested number of records in the artificial data set, and wherein generating the data set for each of the plurality of clusters and the key cluster includes generating the requested number of records for each of the plurality of clusters and the key cluster. One technical benefit of receiving a requested number of records in the artificial data set is that the number of records generated match the number of desired records, thereby reducing the computational load of generating a data set that is larger than needed.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as generating an artificial data set based on an input data set (block 150). In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 131 manages the transfer and storage of images, deploys new instantiations of VCEs and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

Referring now to FIG. 2, a block diagram illustrating a system 200 for generating an artificial data set in accordance with one or more embodiments of the present invention is shown. As illustrated, the system 200 includes a computing system 210 that is configured to receive an input data set 202 and to generate and output an artificial data set 204. In exemplary embodiments, the computing system 210 is embodied in a computer 101 such as the one shown in FIG. 1. As illustrated, the computing system 201 includes a data association module 212, a data clustering module 214, a data analysis module 216, and a data generation module 218.

In exemplary embodiments, the data association module 212 is configured to receive an input data set 202 and analyze the input data set 202. The input data set 202 includes a plurality of entries that each include a plurality of categorical variables. A categorical variable, also known as a qualitative or discrete variable, is a type of variable in statistics and data analysis that represents categories or labels. Categorical variables are used to organize data into groups or classes based on qualitative attributes or characteristics. In exemplary embodiments, the data association module 212 is configured to calculate an association or relationship between categorical variables in the input data set 202.

In one embodiment, the data association module 212 is configured to calculate an association between categorical variables using a chi-squared test, which is a widely used statistical test to determine whether there is a significant association between two categorical variables. The chi-squared test assesses the independence of two variables based on observed and expected frequencies in a contingency table. In another embodiment, the data association module 212 is configured to calculate an association between categorical variables using a Cramer's V method, which calculates a measure of association that quantifies the strength of association between two categorical variables. In one embodiment, the calculated association has a range from 0 to 1, with 0 indicating no association and 1 indicating a perfect association. In one embodiment, the data association module 212 creates an association table that includes the association between each of the categorical variables in the input data set 202.

In exemplary embodiments, the data clustering module 214 is configured to create a plurality of clusters of categorical variables from the input data set 202 based on the association calculated by the data association module 212. In one embodiment, the data clustering module 214 is configured to perform a hierarchical cluster algorithm to group the categorical variables from the input data set 202 into a plurality of clusters such that the association of the categorical variables in the same cluster is strong, and the association of categorical variables in the different clusters is weak. In one embodiment, the hierarchical cluster algorithm begins by treating each categorical variable as a single cluster. The hierarchical cluster algorithm then iteratively merges clusters having the highest association calculated by the data association module 212. In exemplary embodiments, the hierarchical cluster algorithm will continue this process until one of: a maximum number of categorical variables in a cluster is reached, a maximum number of clusters is reached, or the association between categorical variables of different clusters is below a threshold minimum value.

In exemplary embodiments, the data analysis module 216 is configured to analyze the clusters of categorical variables generated by the data clustering module 214 and to identify a key variable for each of the plurality of clusters. In one embodiment, the key variable of a cluster is the variable in the cluster that has the largest average association with the other variables of the cluster. In exemplary embodiments, the data clustering module 214 is further configured to create a key cluster that includes the key variable for each of the plurality of clusters, as identified by the data analysis module 216.

In exemplary embodiments, the data analysis module 216 is configured to create a cluster contingency table for each of the plurality of clusters and for the key cluster. Each cluster contingency table includes combinations of values of the categorical variables, for that cluster, which are obtained from the input data set. In addition, the cluster contingency table includes the corresponding frequency of each combination. Likewise, the cluster contingency table for the key cluster includes combinations of values of the key variables, which are obtained from the input data set and a corresponding frequency of each combination.

In one embodiment, the cluster contingency tables include each of the possible combinations of values of the categorical variables. In another embodiment, the cluster contingency tables only include up to a maximum number of combinations of values of the categorical variables, where the included combinations are selected from all possible combinations based on the corresponding frequency. In one example, the cluster contingency tables are sorted the combination in descending order by frequency and only the top number (N) combination of values are kept. In one embodiment, the lower frequency combinations can be combined into a single entry that is assigned a frequency that is the sum of frequencies of other combinations.

In exemplary embodiments, the data generation module 218 is configured to generate a data set based on the cluster contingency table for each of the plurality of clusters. In addition, the data generation module 218 is configured to generate a data set based on the key cluster contingency table for the key cluster. In exemplary embodiments, each data set is generated based on the combinations of variable values and the corresponding frequency of the combination. In one embodiment, for the first N combinations, the exact combinations will be generated according to the frequencies and for the combination of other combinations, the values for each variable are generated randomly.

In exemplary embodiments, the data generation module 218 is provided with a requested number of records for the artificial data set 204 and generates the requested number of records for each of the plurality of clusters and the key cluster. In one embodiment, the requested number of records for the artificial data set 204 is provided to the computing system 210 by a user.

In exemplary embodiments, the data generation module 218 is also configured to generate the artificial data set 204 based on a combination of the data set for each of the plurality of clusters and the key cluster. In one embodiment, the data generation module 218 is also configured to generate the artificial data set 204 by combining the data set generated for each cluster contingency table using the data set generated for the key cluster as a join key.

Figures 3, 4:
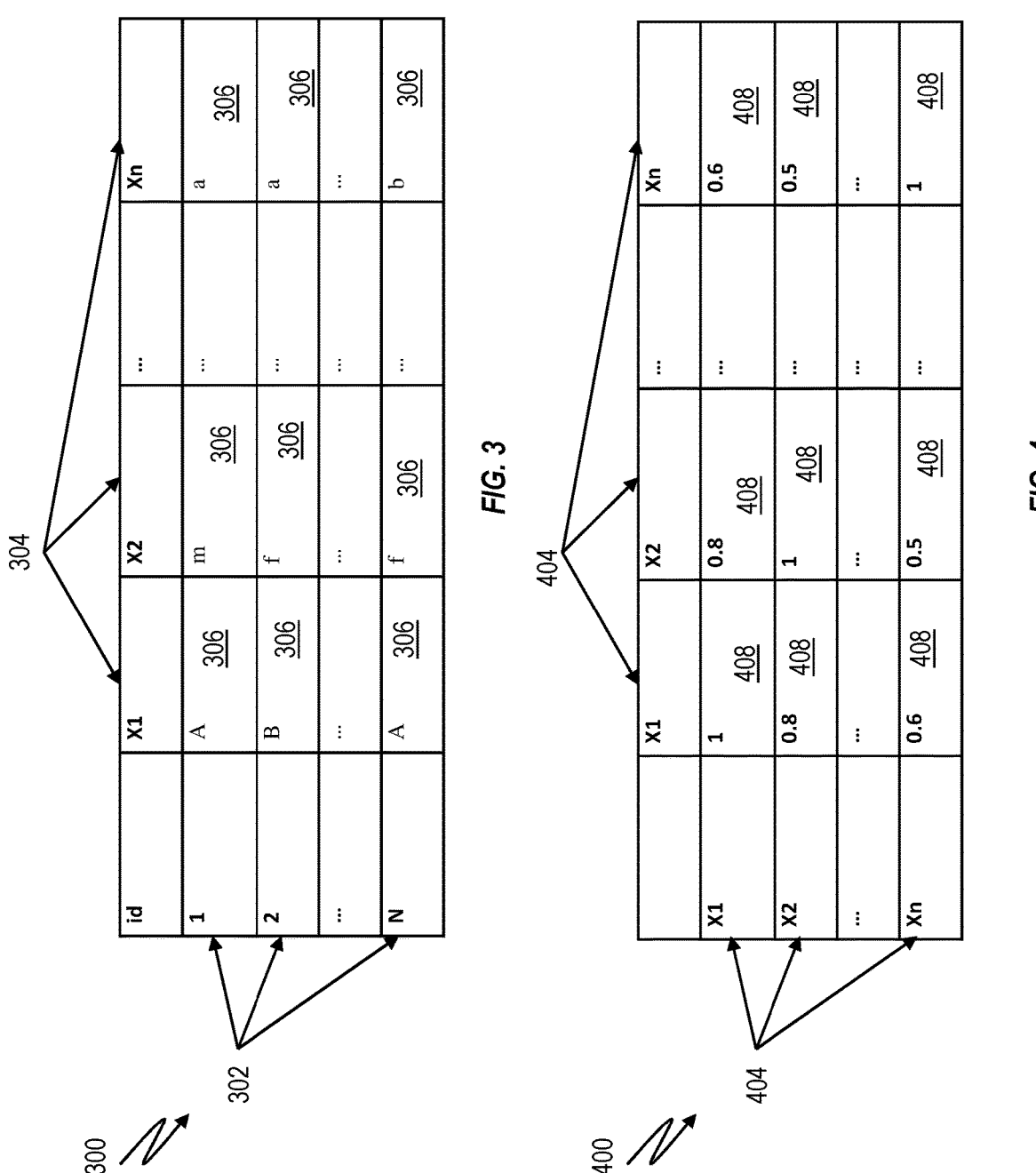
FIG. 3 depicts an input data set in accordance with one or more embodiments of the present invention.
FIG. 4 depicts an association table created based on an input data set in accordance with one or more embodiments of the present invention.

Referring now to FIG. 3, an input data set 300 in accordance with one or more embodiments of the present invention is shown. As illustrated, the input data set 300 includes a plurality of entries 302 and each entry includes values 306 for a plurality of categorical variables. In one example, each entry 302 may correspond to a person and the categorical variables 304 may have values 306 that correspond to demographic, financial, or medical information of the user.

Referring now to FIG. 4, an association table 400 created based on an input data set in accordance with one or more embodiments of the present invention is shown. As illustrated, the association table 400 includes association values 408 for each combination of categorical variables 404. In one embodiment, the association values 408 have a range from 0 to 1, with 0 indicating no association and 1 indicating a perfect association. In one embodiment, the association values 408 are calculated using one of a chi-squared or Cramer's V method.

Figures 5, 6:
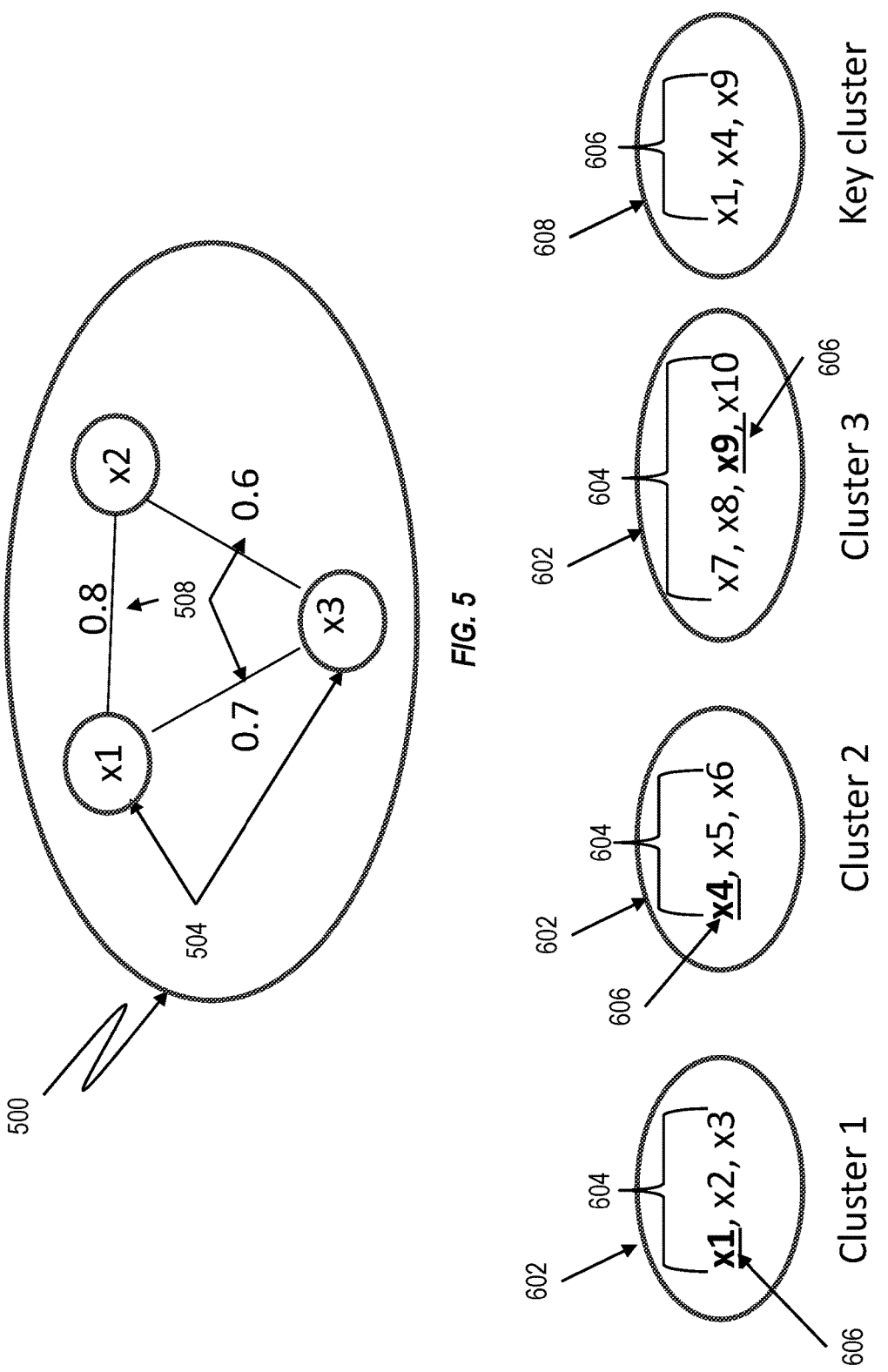
FIG. 5 depicts a cluster of categorical variables in accordance with one or more embodiments of the present invention.
FIG. 6 depicts a plurality of clusters of categorical variables and a key cluster in accordance with one or more embodiments of the present invention.

Referring now to FIG. 5, a cluster 500 of categorical variables in accordance with one or more embodiments of the present invention is shown. As illustrated, cluster 500 includes three categorical variables 504 which are represented as nodes, and three association values 508 that are represented as weighted edges between the nodes.

In exemplary embodiments, the cluster 500 is analyzed to identify a key variable from the categorical variables 504. For example, the three categorical variables 504 (x1, x2, and x3) in the cluster 500 and the associations are 0.8, 0.7, and 0.6 for variable pairs (x1, x2), (x1, x3) and (x2 and x3), respectively, are identified. The average association of each categorical variable 504 is calculated. For example, the average association of x1 is (0.8+0.7)/2−0.75, the average association of x2 is (0.8+0.6)/2−0.7, and the average association of x3 is (0.7+0.6)/2=0.65. The categorical variables 504 having the highest average association, in this example x1, is determined to be the key variable for cluster 500.

Referring now to FIG. 6, a plurality of clusters 602 of categorical variables 604 and a key cluster 608 in accordance with one or more embodiments of the present invention are shown. As illustrated, each of the clusters 602 includes at least three categorical variables 604 one of which is identified as a key variable 606. The key cluster 608 consists of the key variables 606 from each of the plurality of clusters 602 of categorical variables 604. As shown, the number of categorical variables 604 in each cluster 602 does not have to be equal.

Figure 7B:
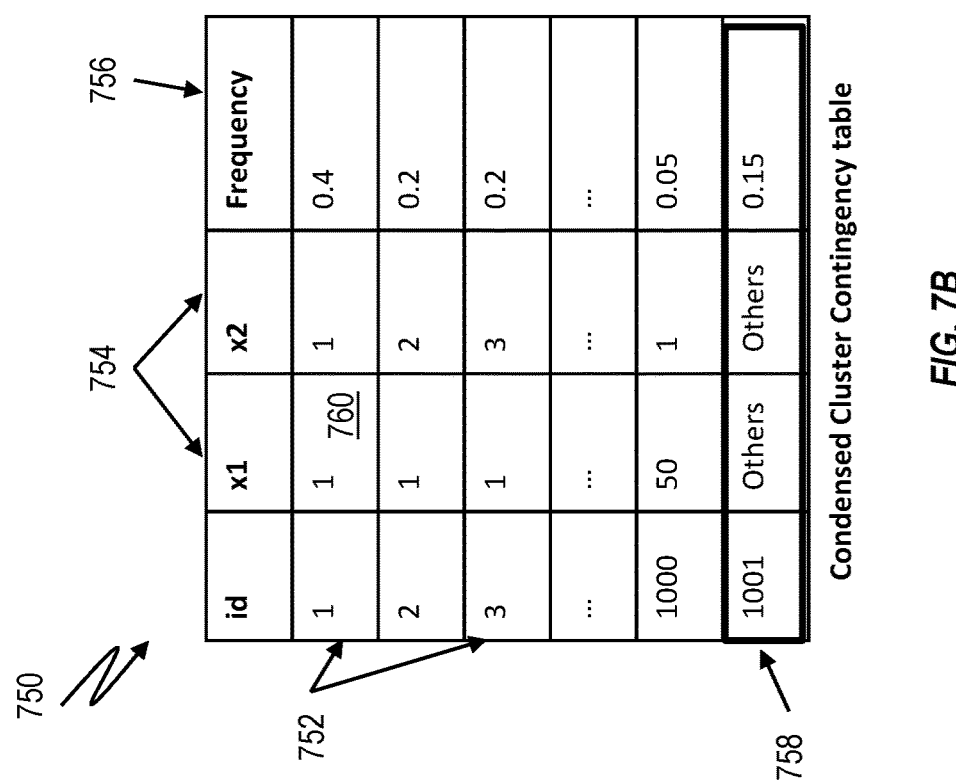
FIG. 7B depicts a condensed cluster contingency table in accordance with one or more embodiments of the present invention.
Figure 7A:
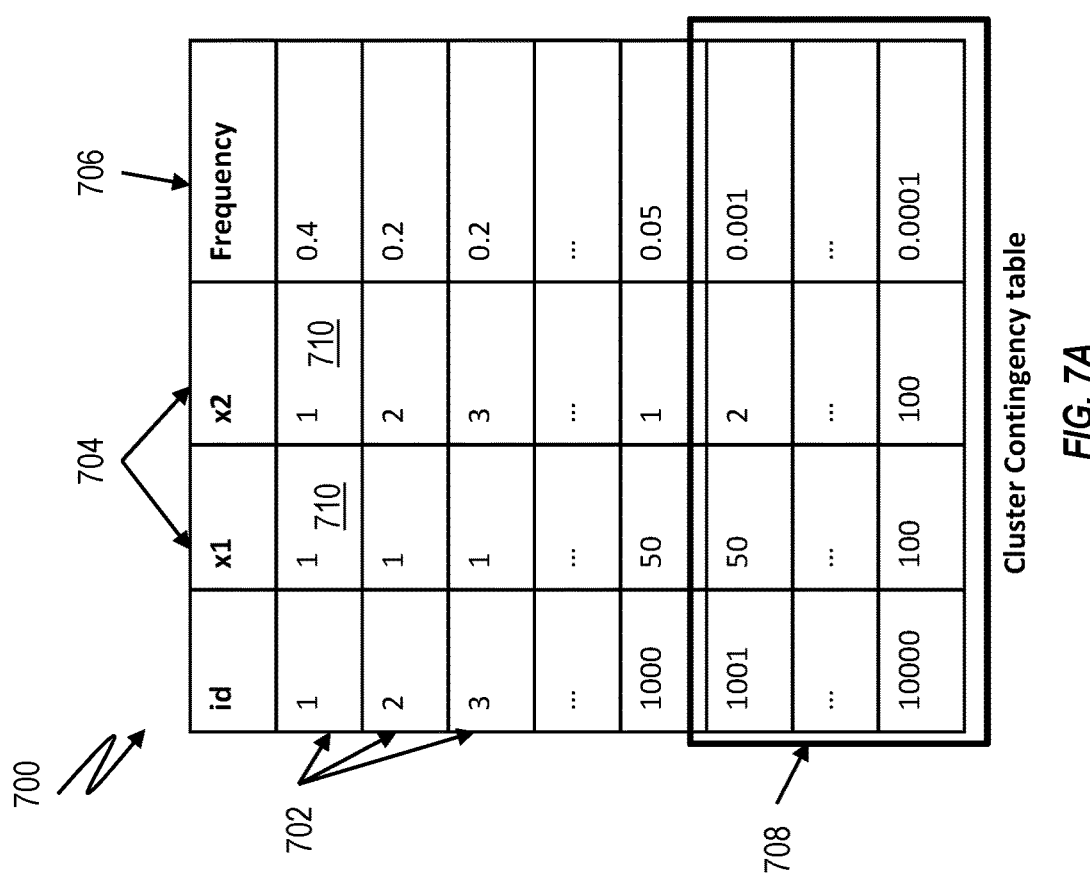
FIG. 7A depicts a cluster contingency table in accordance with one or more embodiments of the present invention.

Referring now to FIG. 7A, a cluster contingency table 700 in accordance with one or more embodiments of the present invention is shown. As illustrated, the cluster contingency table 700 includes a plurality of entries 702 that each corresponds to a possible combination of values 710 for categorical variables 704. In addition, each entry 702 includes a frequency 706 that indicates how often the combination of values 710 occurred in the original data set. In one embodiment, the cluster contingency table 700 can be sorted by the frequency 706 in a decreasing order. In one embodiment, the entries 708 falling below a threshold minimum frequency may be discarded. In one embodiment, entries 708 falling below the top number of entries 702, as illustrated, the top 1000, may be discarded.

Referring now to FIG. 7B, a condensed cluster contingency table 750 in accordance with one or more embodiments of the present invention is shown. As illustrated, the condensed cluster contingency table 750 includes a plurality of entries 752 that each corresponds to a possible combination of values 760 for categorical variables 754. In addition, each entry 752 includes a frequency 756 that indicates how often the combination of values 760 occurred in the original data set. In one embodiment, the condensed cluster contingency table 750 can be sorted by the frequency 756 in a decreasing order. In one embodiment, the entries 758 falling below a threshold minimum frequency are consolidated into a single entry. In one embodiment, entries 708 falling below the top number of entries 702, as illustrated, the top 1000, are consolidated into a single entry. In exemplary embodiments, a frequency assigned to the consolidated group entry is the sum of the entries that were merged into the group. In exemplary embodiments, the threshold minimum frequency and/or the number of top entries to keep are provided by a user.

Figure 8:
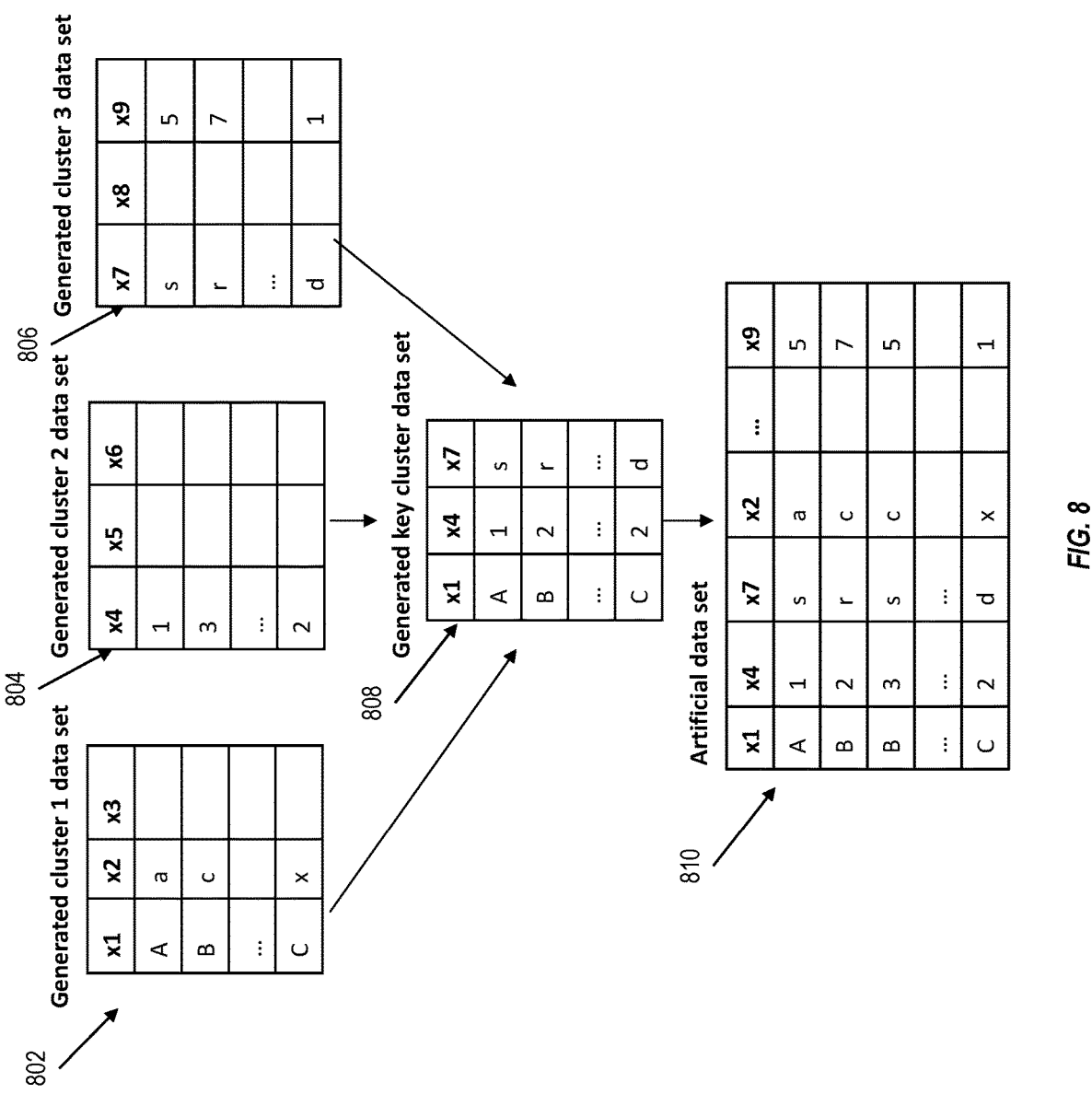
FIG. 8 depicts a schematic diagram illustrating joining generated cluster data sets using a generated key cluster data set to create an artificial data set in accordance with one or more embodiments of the present invention.

Referring now to FIG. 8, a schematic diagram illustrating joining generated cluster data sets using a generated key cluster data set to create an artificial data set 810 in accordance with one or more embodiments of the present invention is shown. In exemplary embodiments, cluster data sets 802, 804, and 806 are generated for each cluster of categorical variables based on their respective cluster contingency tables. In addition, a key cluster data set 808 is generated based on a key cluster contingency table. As illustrated, once the cluster data sets 802, 804, and 806 and key cluster data set 808 are generated, the key cluster data set 808 is used as a join key to identify entries from the cluster data sets 802, 804, and 806 to join and for entries in the artificial data set 810.

Referring now to FIG. 9 a flow diagram illustrating a computer-implemented method 900 for generating an artificial data set in accordance with one or more embodiments of the present invention is shown. In exemplary embodiments, the method 900 is performed by a computing system 210, such as the one shown in FIG. 2. At block 902, the method 900 includes obtaining an input data set having a plurality of entries, wherein each entry includes a plurality of categorical variables.

As shown at block 904, the method 900 includes calculating, based on the input data set, an association between each of the plurality of categorical variables. In one embodiment, the association values 408 have a range from 0 to 1, with 0 indicating no association and 1 indicating a perfect association. In one embodiment, the association values 408 are calculated using one of a chi-squared or Cramer's V method.

As shown at block 906, the method 900 includes creating, based on the association, a plurality of clusters of categorical variables. In exemplary embodiments, each of the plurality of clusters includes at least a number of the plurality of categorical variables. For example, each of the plurality of clusters includes at least three of the plurality of categorical variables.

As shown at block 908, the method 900 includes identifying a key variable for each of the plurality of clusters of categorical variables from the at least the number of the plurality of categorical variables. In exemplary embodiments, the key variable for a cluster of categorical variables is identified as the categorical variable of the cluster having the largest average association with other categorical variables of the cluster. Once the key variable for each of the plurality of clusters of categorical variables has been identified, the method 900 includes creating a key cluster including the key variable for each of the plurality of clusters, as shown at block 910.

As shown at block 912, the method 900 includes creating a cluster contingency table for each of the plurality of clusters and for the key cluster. In exemplary embodiments, the cluster contingency tables include combinations of values of the categorical variables obtained from the input data set and the corresponding frequency of each combination. In one embodiment, the cluster contingency table for each of the plurality of clusters includes combinations with corresponding frequency values above a threshold minimum. In one embodiment, the threshold minimum is a minimum frequency that may be provided by a user as a percentage, such as five percent.

As shown at block 914, the method 900 includes generating, based on the cluster contingency table for each of the plurality of clusters and for the key cluster, a data set for each of the plurality of clusters and the key cluster. In one embodiment, the method also includes receiving a requested number of records in the artificial data set and generating the data set for each of the plurality of clusters and the key cluster includes generating the requested number of records for each of the plurality of clusters and the key cluster. In exemplary embodiments, the generated data set for each of the plurality of clusters and the key cluster includes the requested number of records.

As shown at block 914, the method 900 includes generating the artificial data set based on a combination of the data set for each of the plurality of clusters and the key cluster. In exemplary embodiments, generating the artificial data set includes joining the data set for each of the plurality of clusters using the data set of the key cluster as a join key.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for generating an artificial data set with improved data privacy and reduced computational resource requirements, the method comprising:

obtaining an input data set having a plurality of entries, wherein each entry includes a plurality of categorical variables;

calculating, based on the input data set, an association between each of the plurality of categorical variables using a statistical correlation technique that identifies relationships between variables;

creating, based on the association, a plurality of clusters of categorical variables, wherein each of the plurality of clusters includes at least a number of the plurality of categorical variables to reduce dimensionality of the data processing;

dynamically subdividing one or more of the plurality of clusters, prior to generating a contingency table for the cluster, until a size of a contingency table for each resulting cluster is less than or equal to an available volatile memory of a computing system at the time of table creation;

identifying a key variable for each of the plurality of clusters of categorical variables from the at least the number of the plurality of categorical variables to serve as a representative variable that maintains statistical properties of the cluster;

creating a key cluster including the key variable for each of the plurality of clusters to enable efficient joining of data while preserving statistical relationships;

creating a cluster contingency table for each of the plurality of clusters and for the key cluster, wherein the cluster contingency tables include combinations of values of the categorical variables obtained from the input data set and corresponding frequency of each combination to transform raw data into a structured format that preserves statistical distributions;

generating, based on the cluster contingency table for each of the plurality of clusters and for the key cluster, a data set for each of the plurality of clusters and the key cluster that maintains statistical properties of the original data while removing direct connections to actual data entries; and generating the artificial data set based on a combination of the data set for each of the plurality of clusters and the key cluster, wherein the artificial data set maintains statistical properties of the input data set while providing enhanced data privacy and enabling analysis without exposing original sensitive information.

2. The computer-implemented method of claim 1, wherein the key variable for a cluster of categorical variables is identified as the categorical variable of the cluster having a largest average association with other categorical variables of the cluster.

3. The computer-implemented method of claim 1, wherein the association between each of the plurality of categorical variables is calculated as a Cramér's V value.

4. The computer-implemented method of claim 1, wherein the cluster contingency table for each of the plurality of clusters includes combinations with corresponding frequency values above a threshold minimum.

5. The computer-implemented method of claim 4, wherein the threshold minimum is received from a user.

6. The computer-implemented method of claim 1, wherein generating the artificial data set includes joining the data set for each of the plurality of clusters using the data set of the key cluster as a join key.

7. The computer-implemented method of claim 1, further comprising receiving a requested number of records in the artificial data set, and wherein generating the data set for each of the plurality of clusters and the key cluster includes generating the requested number of records for each of the plurality of clusters and the key cluster.

8. A computer program product having one or more computer readable storage media having computer readable program code collectively stored on the one or more computer readable storage media, the computer readable program code being executed by a processor of a computer system to cause the computer system to perform operations for generating an artificial data set with improved data privacy and reduced computational resource requirements comprising:

obtaining an input data set having a plurality of entries, wherein each entry includes a plurality of categorical variables;

calculating, based on the input data set, an association between each of the plurality of categorical variables using a statistical correlation technique that identifies relationships between variables;

creating, based on the association, a plurality of clusters of categorical variables, wherein each of the plurality of clusters includes at least a number of the plurality of categorical variables to reduce dimensionality of the data processing;

dynamically subdividing one or more of the plurality of clusters, prior to generating a contingency table for the cluster, until a size of a contingency table for each resulting cluster is less than or equal to an available volatile memory of a computing system at the time of table creation;

identifying a key variable for each of the plurality of clusters of categorical variables from the at least the number of the plurality of categorical variables to serve as a representative variable that maintains statistical properties of the cluster;

creating a key cluster including the key variable for each of the plurality of clusters to enable efficient joining of data while preserving statistical relationships;

creating a cluster contingency table for each of the plurality of clusters and for the key cluster, wherein the cluster contingency tables include combinations of values of the categorical variables obtained from the input data set and corresponding frequency of each combination to transform raw data into a structured format that preserves statistical distributions;

generating, based on the cluster contingency table for each of the plurality of clusters and for the key cluster, a data set for each of the plurality of clusters and the key cluster that maintains statistical properties of the original data while removing direct connections to actual data entries; and generating the artificial data set based on a combination of the data set for each of the plurality of clusters and the key cluster, wherein the artificial data set maintains statistical properties of the input data set while providing enhanced data privacy and enabling analysis without exposing original sensitive information.

9. The computer program product of claim 8, wherein the key variable for a cluster of categorical variables is identified as the categorical variable of the cluster having a largest average association with other categorical variables of the cluster.

10. The computer program product of claim 8, wherein the association between each of the plurality of categorical variables is calculated as a Cramér's V value.

11. The computer program product of claim 8, wherein the cluster contingency table for each of the plurality of clusters includes combinations with corresponding frequency values above a threshold minimum.

12. The computer program product of claim 11, wherein the threshold minimum is received from a user.

13. The computer program product of claim 8, wherein generating the artificial data set includes joining the data set for each of the plurality of clusters using the data set of the key cluster as a join key.

14. The computer program product of claim 8, wherein the operations further comprise receiving a requested number of records in the artificial data set, and wherein generating the data set for each of the plurality of clusters and the key cluster includes generating the requested number of records for each of the plurality of clusters and the key cluster.

15. A computing system for generating an artificial data set with improved data privacy and reduced computational resource requirements comprising:

a processor;

a memory coupled to the processor; and one or more computer readable storage media coupled to the processor, the one or more computer readable storage media collectively containing instructions that are executed by the processor via the memory to cause the processor to perform operations comprising:

obtaining an input data set having a plurality of entries, wherein each entry includes a plurality of categorical variables;

calculating, based on the input data set, an association between each of the plurality of categorical variables using a statistical correlation technique that identifies relationships between variables;

creating, based on the association, a plurality of clusters of categorical variables, wherein each of the plurality of clusters includes at least a number of the plurality of categorical variables to reduce dimensionality of the data processing;

dynamically subdividing one or more of the plurality of clusters, prior to generating a contingency table for the cluster, until a size of a contingency table for each resulting cluster is less than or equal to an available volatile memory of a computing system at the time of table creation;

identifying a key variable for each of the plurality of clusters of categorical variables from the at least the number of the plurality of categorical variables to serve as a representative variable that maintains statistical properties of the cluster;

creating a key cluster including the key variable for each of the plurality of clusters to enable efficient joining of data while preserving statistical relationships;

creating a cluster contingency table for each of the plurality of clusters and for the key cluster, wherein the cluster contingency tables include combinations of values of the categorical variables obtained from the input data set and corresponding frequency of each combination to transform raw data into a structured format that preserves statistical distributions;

generating, based on the cluster contingency table for each of the plurality of clusters and for the key cluster, a data set for each of the plurality of clusters and the key cluster that maintains statistical properties of the original data while removing direct connections to actual data entries; and generating the artificial data set based on a combination of the data set for each of the plurality of clusters and the key cluster, wherein the artificial data set maintains statistical properties of the input data set while providing enhanced data privacy and enabling analysis without exposing original sensitive information.

16. The computing system of claim 15, wherein the key variable for a cluster of categorical variables is identified as the categorical variable of the cluster having a largest average association with other categorical variables of the cluster.

17. The computing system of claim 15, wherein the association between each of the plurality of categorical variables is calculated as a Cramér's V value.

18. The computing system of claim 15, wherein the cluster contingency table for each of the plurality of clusters includes combinations with corresponding frequency values above a threshold minimum.

19. The computing system of claim 15, wherein generating the artificial data set includes joining the data set for each of the plurality of clusters using the data set of the key cluster as a join key.

20. The computing system of claim 15, wherein the operations further comprise receiving a requested number of records in the artificial data set, and wherein generating the data set for each of the plurality of clusters and the key cluster includes generating the requested number of records for each of the plurality of clusters and the key cluster.

* * * * *